United States Patent [19]

Ryan

[11] Patent Number: 4,862,629

[45] Date of Patent: * Sep. 5, 1989

[54] FISH LURE

[76] Inventor: Vernon E. Ryan, Box 465, Anthony, Kans. 67003

[*] Notice: The portion of the term of this patent subsequent to Apr. 19, 2005 has been disclaimed.

[21] Appl. No.: 149,485

[22] Filed: Jan. 28, 1988

Related U.S. Application Data

[63] Continuation of Ser. No. 73,586, Jul. 15, 1987, Pat. No. 4,738,047.

[51] Int. Cl.⁴ ............................................. A01K 85/00
[52] U.S. Cl. .................................. 43/42.25; 43/42.28; 43/42.37; 43/42.39; 43/42.47
[58] Field of Search ................. 43/42.25, 42.28, 42.37, 43/42.39, 42.45, 42.47

[56] References Cited

U.S. PATENT DOCUMENTS

| | | | |
|---|---|---|---|
| 1,644,151 | 10/1927 | Rodgers | 43/42.24 |
| 2,005,554 | 6/1935 | Milner | 43/42.28 |
| 4,437,257 | 3/1984 | Kluge | 43/42.47 X |
| 4,712,326 | 12/1987 | Hoover et al. | 43/42.39 X |
| 4,738,047 | 4/1988 | Ryan | 43/42.25 |

Primary Examiner—Nicholas P. Godici
Assistant Examiner—Carmine Cuda
Attorney, Agent, or Firm—John W. Carpenter

[57] ABSTRACT

A non-diving fish lure having a fish hook with a bill, and a spherical body. A spoon is implanted into the lower portion of the spherical body and angles upwardly until an end of the spoon is on a common horizontal plane with a section of the bill. A method for producing a fish lure.

5 Claims, 5 Drawing Sheets

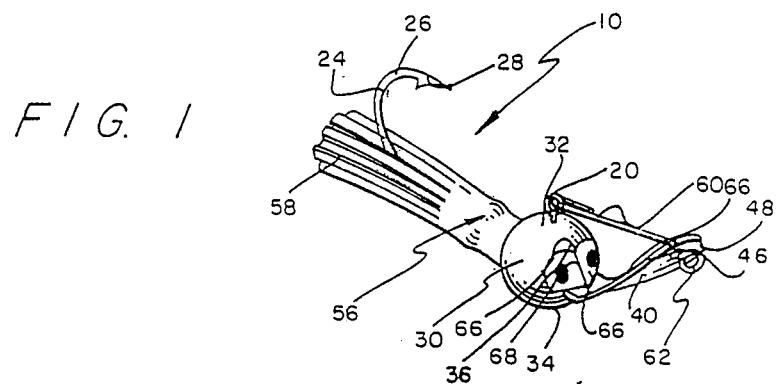
FIG. 1
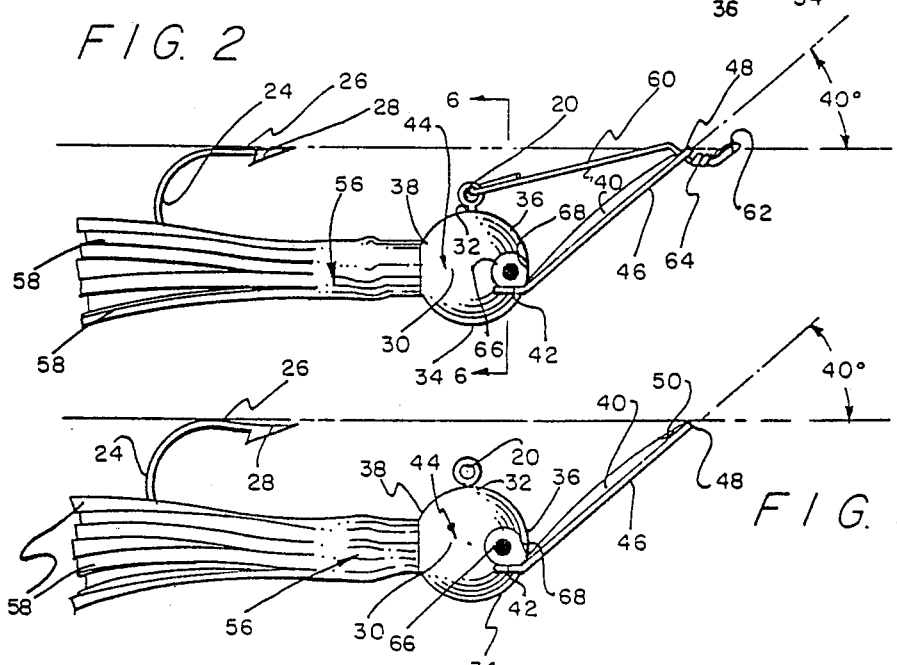
FIG. 2
FIG. 3
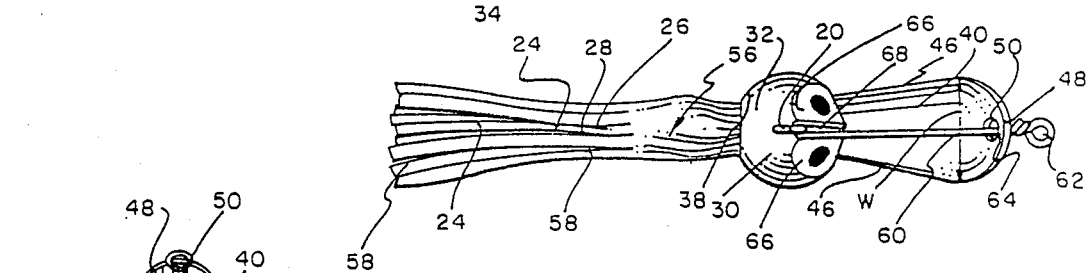
FIG. 4
FIG. 5

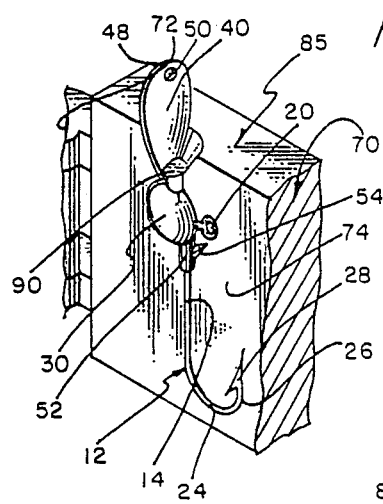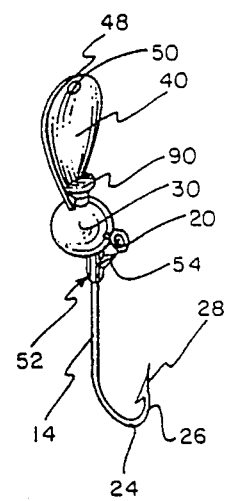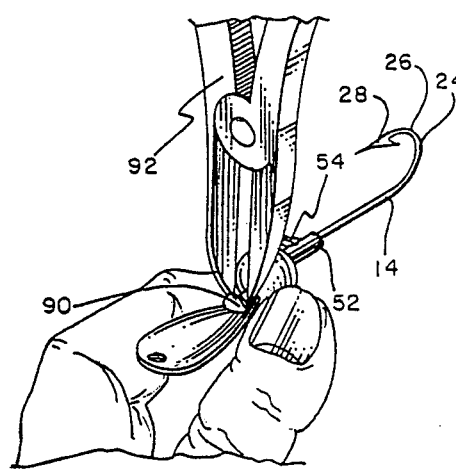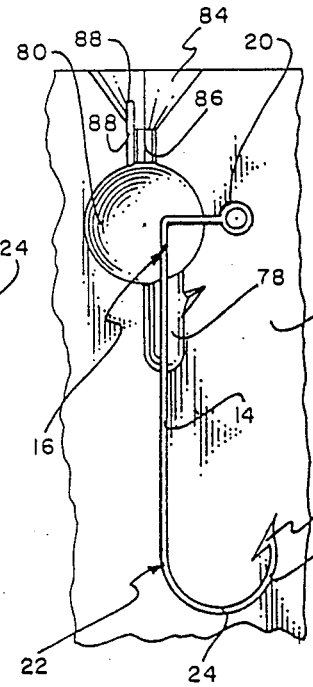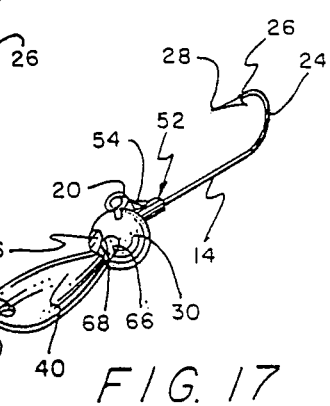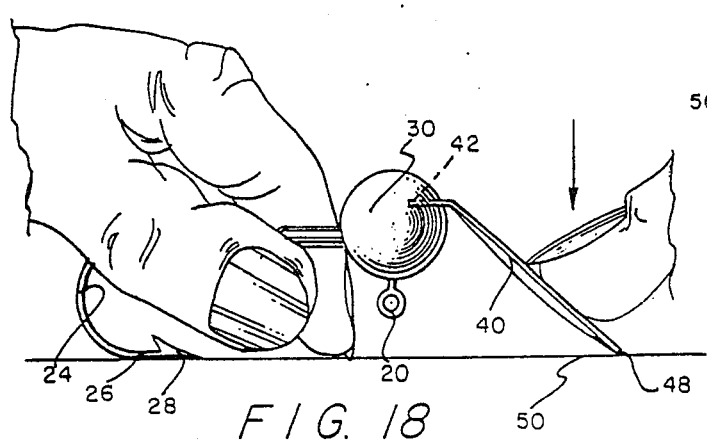

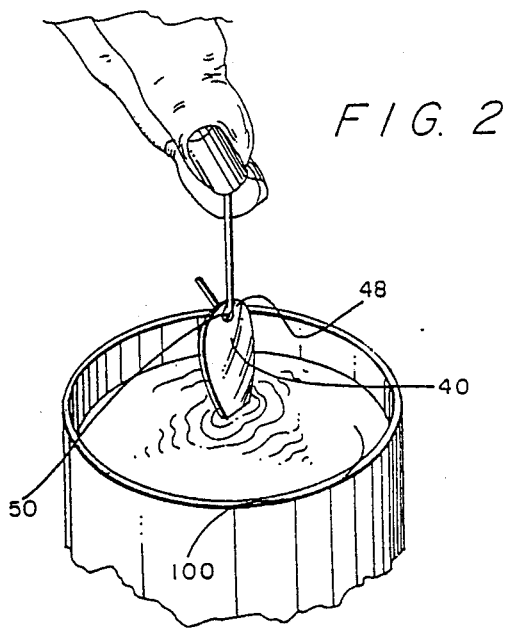
FIG. 24
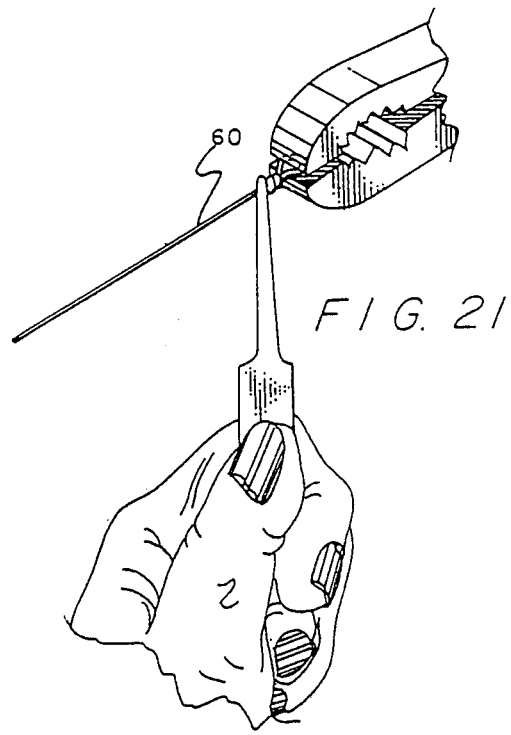
FIG. 21
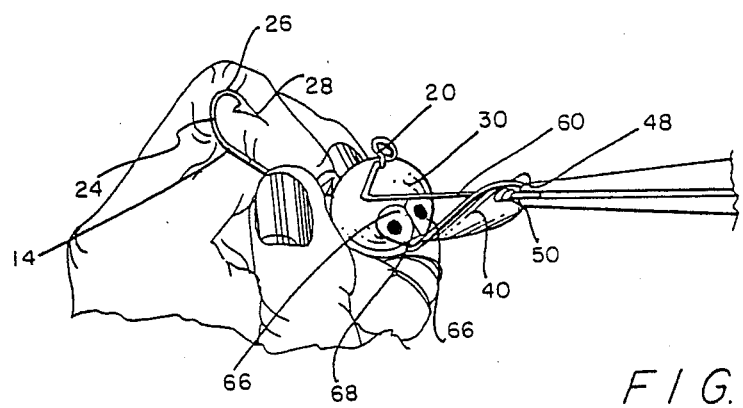
FIG. 22
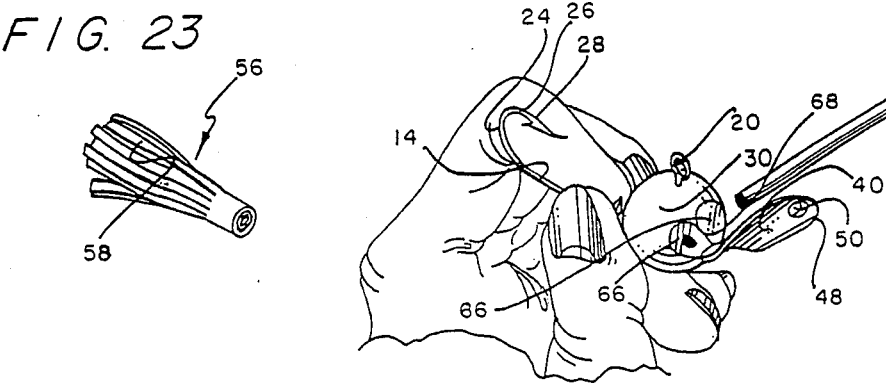
FIG. 23
FIG. 25

FISH LURE

This is a continuation of copending application Ser. No. 073,586, filed July 15, 1987, now U.S. Pat. No. 4,738,047.

BACKGROUND OF THE INVENTION

1. Field of the Invention

This invention is related to a fish lure. More specifically, this invention provides a fish lure and a method for making a fish lure.

2. Description of the Prior Art

A patentability investigation has discovered the following U.S. Pat. Nos.: 1,700,061; 1,723,193; 1,490,389; 2,523,949; 2,946,149; 2,295,765; 2,499,718; 3,410,020; 3,950,882; 1,546,105; and 3,495,350. U.S. Design Patents Nos. 226,710 and 245,785 were also discovered in the patentability investigation. None of the foregoing prior art U.S. patents teach or suggest the particular fish lure and method for making same of this invention.

SUMMARY OF THE INVENTION

The present invention accomplishes its desired objects by broadly providing a non-diving fish lure having a fish hook with a shank that has a front end terminating into an upturned portion with an eye and which is generally normal to the shank. The fish hook has a rear end terminating into a bill that has a bill section which is generally parallel to the shank and terminates into a forwardly projecting barb. A generally spherical body member with a body top, a body front, a body back, a body bottom, encases the front end of the shank including a portion of the shank and a portion of the upturned portion such that the eye extends above the body top. A spoon member has an end bound within the body bottom of the body member and below the center of gravity of the body member and slants upwardly to where another end of the spoon member lies in a horizontal plane that is common to a horizontal plane of the bill section. The spoon member has a spoon aperture in close proximity to the other end of the spoon member being in a common horizontal plane with the bill section such that when the fish lure is being pulled the line of pull is above the center of gravity. A generally cylindrical support member encases a portion of the shank and is integrally bound to the spherical body member. The cylindrical support member has a structure defining a short barb. The fish lure additionally comprises a skirt means engaged around the cylindrical support means and to the short barb and has a plurality of strands forming a rearwardly projecting simulated tail on the body member.

The present invention further accomplishes its desired objects by broadly providing a method for producing a fish lure comprising the steps of:

(a) providing a die means having a first die member and a second die member pivotally secured to each other, said fist die member has a face having a structure defining a first semi-front hook recess for receiving a portion of a shank and a bow of a fish hook, a first semi-cylindrical recess in communication with the first semi-front hook recess, a first semi-spherical recess in communication with the first semi-cylindrical recess, a first semi-rear hook recess in communication with the first semi-spherical recess and is for receiving an eye of the fish hook, a first semi-funnel shaped recess communicating with the first semi-spherical recess and extending through part of a side of the first die member, and a first semi-slot extending through the wall of the first semi-funnel shaped recess and into the first semi-spherical recess by-passing a bottom portion of the first semi-funnel shaped recess; and said second die member has a face having a structure defining a second semi-front hook recess, a second semi-cylindrical recess in communication with the second semi-front hook recess, a second semi-spherical recess in communication with the second semi-cylindrical recess, a second semi-rear hook recess in communication with the second semi-spherical recess, a second semi-funnel shaped recess communicating with the second semi-spherical recess and extending through part of a side of the second die member, a second semi-slot extending through the wall of the second semi-tunnel shaped recess and into the second semi-spherical recess by-passing a bottom portion of the second semi-funnel;

(b) positioning a fish hook on the face of the first die member such that a bill including a barb and a portion of a shank of the fish hook lie in the first semi-front hook recess and an eye of the fish hook lie in the first semi-rear hook recess;

(c) closing pivotally the first and second die members together such that the first and second semi-front hook recesses mate, the first and second semi-cylindrical recesses mate, the first and second semi-spherical recesses mate, the first and second semi-rear hook recesses mate, the first and second semi-funnel shaped recesses mate, the first and second semi-slots mate in order to totally encapsulate the fish hook;

(d) inserting a spoon through the mated first and second semi-slots such that an end of the spoon is situated within the mated first and second semi-spherical recesses;

(e) pouring molten metal through the mated first and second semi-funnel shaped recesses to form when the molten metal solidifies a generally spherical body encasing a portion of the fish hook and the end of the spoon in step (d);

(f) cooling the molten metal until solidified;

(g) pivoting the second die member away from the first die member;

(h) removing the fish hook-spoon-spherical body combination from the face of the second die member; and (i) bending the spoon until the end of spoon, which is opposed to the end of the spoon in step (d), has a horizontal plane that is common to the horizontal plane of the barb of the fish hook.

It is therefore an object of this invention to provide a non-diving fish lure.

It is yet another object of this invention to provide a method for producing a fish lure.

These, together with the various ancillary objects and features which will become apparent to those skilled in the art as the following description proceeds, are attained by this novel fish lure and process, a preferred embodiment being shown with reference to the accompanying drawings, by way of example only, wherein:

BRIEF DESCRIPTION OF THE DRAWINGS

FIG. 1 is a perspective view of the fish lure of this invention;

FIG. 2 is a side elevational view of the fish lure of FIG. 1;

FIG. 3 is a side elevational view of another embodiment of the fish lure without the wire link such that a fishing line connects to the spoon through an aperture at the end thereof;

FIG. 4 is an end elevational view of the fish lure of FIG. 1;

FIG. 5 is a top plane view of the fish lure of FIG. 1;

FIG. 15 is a perspective view of the fish lure after being removed from a face of the die;

FIG. 16 is a perspective view of needle point pliers pinching off a part of the spherical body to form a pair of beveled surfaces thereon;

FIG. 17 is a perspective view of the fish lure of FIG. 15 after part of the spherical body has been removed;

FIG. 18 is a side elevational view of the spoon being bent downwardly until an end thereof is on a common horizontal plane with a section of the bill;

FIG. 19 is a perspective view of the fish lure of FIG. 15 in the recesses on the face of the die after solidifying;

FIG. 20 is an exploded view of the fish hook in position in the recesses on the face of the die for being encased when the spherical body is formed partly around it;

FIG. 21 is a perspective view of the wire link being formed;

FIG. 22 is a perspective view of the wire link being passed through an aperture in the spoon to hook up to the eye of the fish hook;

FIG. 23 is a perspective view of the skirt;

FIG. 24 is a perspective view of the fish lure being dipped into paint; and

FIG. 25 is a perspective view of the fish lure being painted cosmetically.

DETAILED DESCRIPTION OF THE INVENTION

Figure 8:
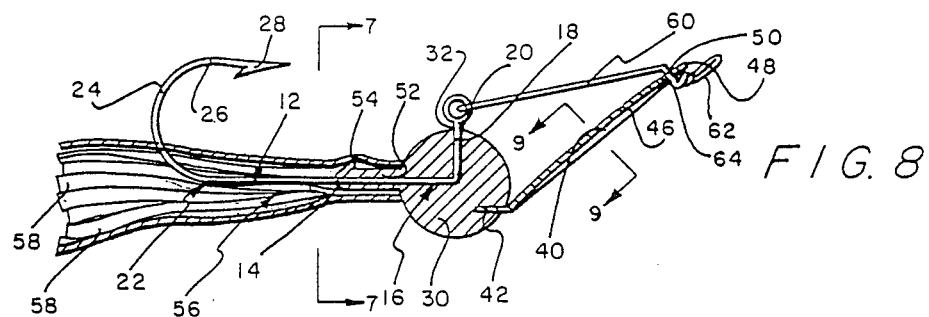
FIG. 8 is a vertical sectional view through the fish lure of FIG. 1.
Figure 7:
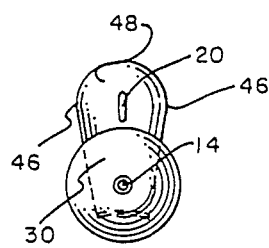
FIG. 7 is a vertical sectional view taken in direction of the arrows and along the plane of line 7—7 in FIG. 8.
Figure 6:
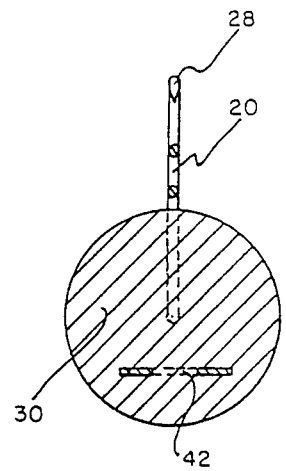
FIG. 6 is a vertical sectional view taken in direction of the arrows and along the plane of line 6—6 in FIG. 2.
Figure 10:
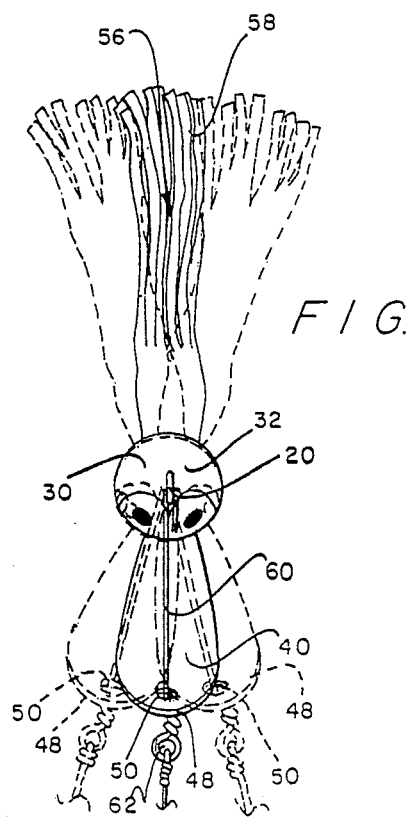
FIG. 10 is a top plan view of the fish lure of FIG. 1 disclosing the various paths of motion of the fish lure as it is being pulled through the water.
Figure 9:
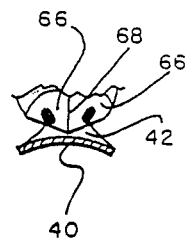
FIG. 9 is a vertical sectional view taken in direction of the arrows and along the plane of line 9—9 in FIG. 8.
Figure 14:
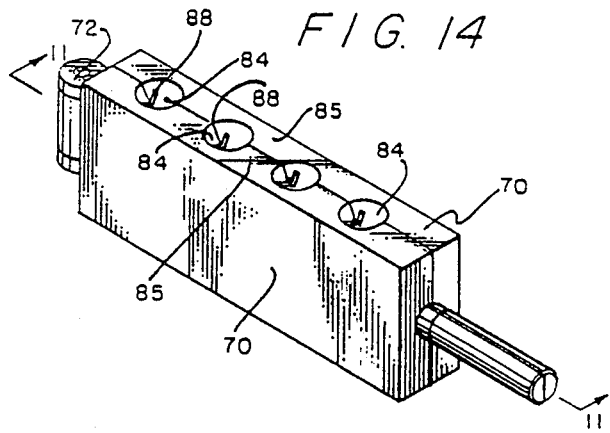
FIG. 14 is a perspective view of the die used to produce the fish lure.

Referring in detail now to the drawings wherein similar parts of the invention are identified by like reference numerals, there is seen the non-diving fishing lure, generally illustrated as 10. The fishing lure 10 has a fish hook, generally illustrated as 12 (see FIG. 8), that has a shank 14 with a front end 16 terminating into an upturned portion 18 which includes an eye 20. The upturned portion 18 is generally normal to the shank 14. The fish hook also has a rear end 22 that terminates in a bill 24 with a bill section 26. The bill section 26 is generally parallel to the shank 14 and terminates in a forwardly projecting barb 28.

The fishing lure 10 additionally has a generally spherical body 30 with a top 32, a bottom 34, a front 36, and a back 38. The spherical body 30 encases the front end 16 of the shank 14 including a portion of the shank 14 and a portion of the upturned portion 18 such that the eye 20 extends above the top 22.

A spoon 40 has an end 42 implanted within the bottom 34 of the spherical body 30 and below the center of gravity, generally illustrated as 44, of the spherical body 30. The spoon 40 slants upwardly at an angle of from about 30 degrees to about 50 degrees, preferably about 40 degrees, with a horizontal plane. As illustrated in the drawings, the spoon 40 is curved longitudinally such as to have a convex surface facing the generally spherical body 30. End 42 of the spoon 40 is generally parallel to the shank 14 of the fish hook 10. The end 42 lies below the shank 14 within the spherical body 30 and is below the center of gravity 44 of the spherical body 30. The spoon 40 additionally has a pair of spoon edges 46—46 that flares outwardly and away from the spherical body 30 such that an extreme width (indicated as "W" in FIG. 4) with respect to a plane along the spoon edges 46—46 is from about 0.60 to about 1.5 times the diameter of the spherical body 30, depending on the composition of the body 30. The length of the spoon 40 also depends on the composition of the body 30 but is generally from about 3.5 to about 4.5 times the diameter of the spherical body 30. Preferably body 30 is manufactured from molten lead to provide the required sinking for the fishing lure 10.

The spoon 40 terminates in an end 48 that lies in a horizontal plane (see FIG. 2) that is common to a horizontal plane of the bill section 26 which is generally parallel to the shank 14. Spoon 40 has a spoon aperture 50 which is in close proximity to the end 48 such that when the fish lure 10 is being pulled by fishing line, the line of pull is above the center of gravity.

A generally cylindrical support member, illustrated generally as 52 in FIGS. 15 and 17, encases a portion of the shank 14 and is integrally bound to the spherical body 30. The support member 52 has a barb 54 which is for engaging a skirt member, generally illustrated as 56, that has a plurality of strands 58 forming a rearwardly projecting simulated tail on the spherical body 30.

The fish lure 10 of this invention preferably comprises a wire link 60 secured to the eye 20 of the fish hook 12 and extends through the spoon aperture 50 and terminates in a link eye 62 where a fishing line attaches in order that the fish lure 10 might be pulled. Wire link 60 is absolutely not necessary and may be omitted (as illustrated in FIG. 3) such that the fishing line attaches to and through spoon aperture 50. Wire link 60 is primarily used for the larger fish because the pull would be directly on the fish hook 12 as opposed to on the end 48 of the spoon 40 which may cause end 42 to work loose from within the body 30. Wire link 60 has an askewed section 64 that awrys obliquely from the main body of the wire link 60. The askewed section 64 passes through the spoon aperture 50 and includes the link eye 62 at the end thereof.

In a preferred embodiment of the invention, the spherical body is formed with a pair of beveled surfaces 66—66 that taper to meet in an edge or nose 68. The pair of beveled surfaces 66—66 are immediately above end 42 of the spoon 40, and may be cosmetically treated to represent that the fish lure 10 has a pair of eyes as illustrated in FIGS. 1-3.

Figure 11:
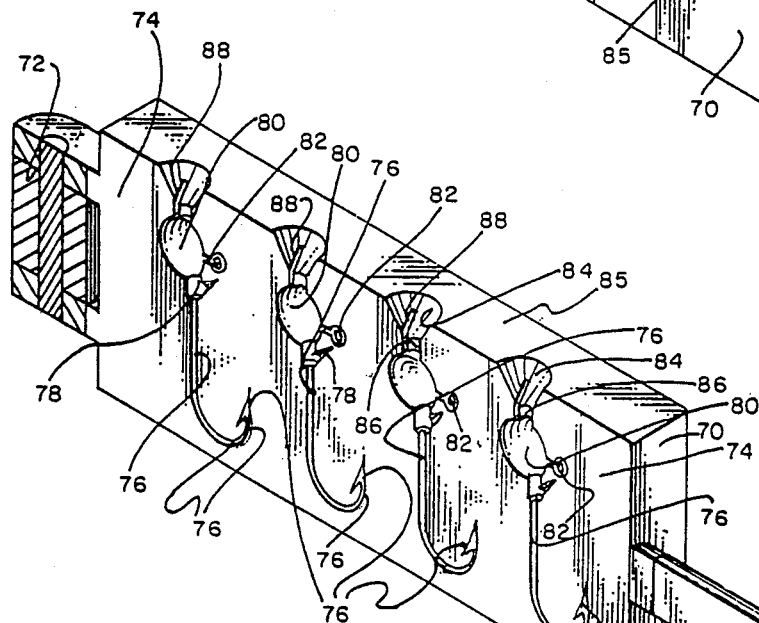
FIG. 11 is a vertical sectional view taken in direction of the arrows and along the plane of line 11—11 in FIG. 14.
Figure 12:
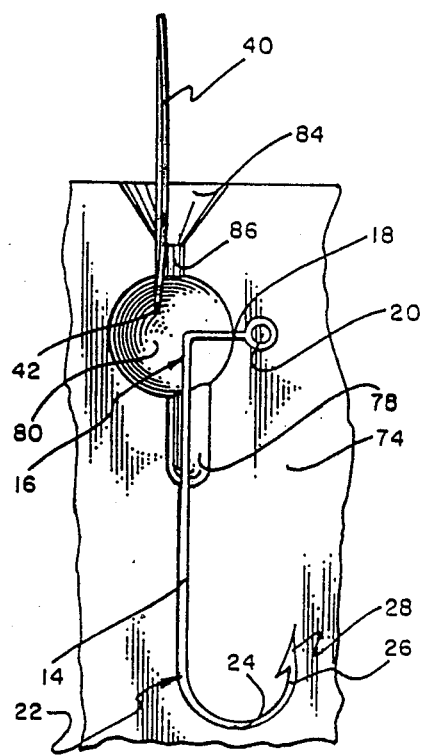
FIG. 12 is an exploded plane view disclosing the spoon and fish hook in position to be encased by solidified metal after molten metal is poured through a funnel in the die and is allowed to solidify.
Figure 13:
FIG. 13 is a side elevational view of molten liquid being poured through a funnel to produce the fish lure.

With continuing reference to the drawings for the method for producing the fish lure 10, a pair of dies 70—70 are provided such as to be pivotally secured to each other at 72. Each die 70 is a mirror image of the other die 70. As best shown in FIG. 11, die 70 has a face 74 with a structure defining a semi-front hook recess 76 for receiving a portion of the shank 14, the bill 24 and bill section 26, as well as the barb 28 of the fish hook 12. A semi-cylindrical recess 78 is in communication with the semi-front hook recess 76 as well as a semi-spherical recess 80. A semi-rear hook recess 82 is also in communication with the semi-spherical recess 80 and receives the eye 20 of the fish hook 12. A semi-funnel recess 84 extends through a side 85 of the dice 70 and has a semi-bottom recess 86 at the bottom thereof which communicates with the semi-spherical recess 80. A semi-slot 88 extends through the walls of the semi-funnel recess 84 and into the semi-spherical recess 80, by-passing (as illustrated in FIG. 20) semi-bottom recess 86 such that the semi-slot 88 does not communicate with the semi-bottom recess 86. The other die 70 also has a face (not shown in the drawings) which has all of the recesses and slot of die 70 (in FIG. 11) but in mirror image form. More specifically, the other die 70 has a face with a mirror imaged semi-front hook recess 76, a mirror imaged semi-cylindrical recess 78, a mirror imaged semi-spherical recess 80, a mirror imaged semi-rear hook recess 82, a mirror imaged semi-funnel recess 84 with a mirror imaged semi-bottom recess 86, and a mirror imaged semi-slot 88 recess that also by-passes mirror imaged semi-bottom recess. One (or more) fish hooks 12 is positioned on the face 74 of the die 70 of FIG. 11 such that the bill 24 (and the bill section 26 and barb 28) and a portion of the shank 14 lie in the semi-front hook recess 76 and the eye 20 of the fish hook 12 lies in the semi-rear hook recess 82. The pair of dies 70—70 are pivotally closed to flush the respective faces 74 against each other to totally encapsulate the fish hook 12. When the pair of dies 70—70 are pivoted into a contact relationship with respect to each other, all semi-recesses and semi-slots mate with their respective mirror imaged semi-recesses and semi-slots while the fish hook 12 is enclosed there between. The spoon 40 is subsequently inserted through the semi-slot 88 and its mirror imaged semi-slot 88 such that the end 42 of the spoon 40 is situated within the mated semi-slot 88-mirror imaged semi-slot 88. As illustrated in FIG. 13, molten metal (e.g. lead) is poured through the mated semi-funnel shaped recess 84-mirror imaged semi-funnel shaped recess 84 to form when the molten metal solidifies, the generally spherical body 30 encasing the front part 16 of the fish hook 12 and the end 42 of the spoon 40. The molten metal is allowed to cool and solidify, and subsequently the dies 70—70 are pivoted away from each other to expose a fish hook 12-spoon 40-spherical body 30 combination (see FIG. 19) on the face 74 of the die 70. The combination is removed and has a residual solidified molten metal part 90 that has resulted from molten metal solidifying within the semi-bottom recess 86 and its mated mirror imaged on the face of the other die 70. This residual part 90 may be easily removed since it is not bound to the spoon 40 as the semi-slot 88 with the mated mirror image on the other die 70 is separated from the mated semi-bottom recess 86-mirror imaged semi-bottom recess 86. Removing is preferably accomplished by pinching-off with needle point pliers 92 (see FIG. 16) the residual part 90, causing the removal of the residual part 90 while simultaneously forming the pair of beveled surfaces 66—66 and the nose 68. After the residual part 90 has been removed, the spoon 40 is bent (see FIG. 18) downwardly until end 48 of spoon 40 is in a common horizontal plane with the bill section 26 as illustrated in FIG. 18. The fish hook 12-body 30-spoon 40 combination of FIG. 18 is subsequently painted such as by dipping it into paint 100 (see FIG. 24), leaving the spoon 40 unpainted in order to maintain its reflective surface. After the paint 100 has dried, cosmetic painting takes place, as illustrated in FIG. 25, to position or label representation of eyes on the pair of beveled surfaces 66—66.

The wire link 60 may be formed (see FIG. 21) and passed through the spoon aperture to engage the eye 20 of the fish hook 12. The askewed section 64 may be formed off of the main body of the wire link 60 by bending such that the askewed section 64 can readily pass through the spoon aperture 50.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A non-diving fish lure comprising
   a fish hook having a shank with a front end and a rear end terminating into a bill that has a bill section which is generally parallel to said shank and terminates into a forwardly projecting barb;
   a body member having a body top, a body front, a body back, a body bottom, and encasing said front end of said shank including a portion of said shank;
   a spoon member having an end bound within said body member and below the center of gravity of said body member and slanting upwardly to where another end of said spoon member lies in a horizontal plane that is generally common to a horizontal plane of said bill section that is generally parallel to the shank; said spoon member having a spoon aperture in close proximity to said other end of said spoon member being in a general common horizontal plane with said bill section such that when the fish lure is being pulled the line of pull is above the center of gravity;
   a generally cylindrical support member encasing a portion of said shank and integrally bound to said body member; and
   a skirt means engaged around said cylindrical support means, said skirt means having a plurality of strands forming a rearwardly projecting simulated tail on the body member.

2. The non-diving fish lure of claim 1 wherein said cylindrical support member has a structure defining a short barb means to assist in retaining the skirt means.

3. The non-diving fish lure of claim 2 wherein said skirt means is engaged to said short barb.

4. The non-diving fish lure of claim 1 wherein said body member is generally spherical.

5. The non-diving fish lure of claim 1 wherein the end of said spoon member is bound within the body bottom of said body member.

* * * * *